(12) United States Patent
Marquis et al.

(10) Patent No.: US 10,858,955 B2
(45) Date of Patent: Dec. 8, 2020

(54) GAS TURBINE ENGINE HAVING A SEALING MEMBER

(71) Applicant: United Technologies Corporation, Farmington, CT (US)

(72) Inventors: Julie J. Marquis, West Hartford, CT (US); Armando Amador, Wethersfield, CT (US); David C. Kiely, New Britain, CT (US); Nasr A. Shuaib, Watertown, MA (US); Brian Stahl, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 236 days.

(21) Appl. No.: 15/933,537

(22) Filed: Mar. 23, 2018

(65) Prior Publication Data

US 2019/0292941 A1    Sep. 26, 2019

(51) Int. Cl.
| *F01D 25/18* | (2006.01) |
| *F01D 11/00* | (2006.01) |
| *F01D 11/02* | (2006.01) |
| *F01D 25/16* | (2006.01) |
| *F16C 33/66* | (2006.01) |

(52) U.S. Cl.
CPC .......... *F01D 25/183* (2013.01); *F01D 11/003* (2013.01); *F01D 11/005* (2013.01);
(Continued)

(58) Field of Classification Search
CPC ...... F01D 25/162; F01D 25/183; F01D 11/02; F01D 11/003; F01D 11/005;
(Continued)

(56) References Cited

U.S. PATENT DOCUMENTS 3,572,733 A    3/1971  Howald et al.
5,291,732 A *  3/1994  Halila .................. F23R 3/60
                                                       60/752
(Continued)

FOREIGN PATENT DOCUMENTS

| EP | 3282153 A1 | 2/2018 |
| EP | 3421737 A1 | 1/2019 |
| WO | 2011035798 A1 | 3/2011 |

OTHER PUBLICATIONS

European Search Report for Application No. 19164722.1; dated Aug. 23, 2019 (11 pages).

(Continued)

*Primary Examiner* — Courtney D Heinle
*Assistant Examiner* — Ryan C Clark
(74) *Attorney, Agent, or Firm* — Cantor Colburn LLP

(57) ABSTRACT

A gas turbine engine includes a cover, a support, and a sealing member. The cover has a cover housing and a cover arm extending from the cover housing between a first arm end connected to the cover housing and a second arm end having a cover end surface. The support has a support body, a first support arm extending between a first support arm first end connected to the support body and a first support arm second end. The cover arm extends into the first support arm. The sealing member at least partially extends across a gap defined between the cover end surface and the first support arm.

17 Claims, 7 Drawing Sheets

(52) U.S. Cl.
CPC ............ *F01D 11/02* (2013.01); *F01D 25/162* (2013.01); *F16C 33/6685* (2013.01); *F05D 2240/50* (2013.01); *F05D 2240/56* (2013.01); *F05D 2260/36* (2013.01); *F05D 2260/98* (2013.01)

(58) Field of Classification Search
CPC ............ F16C 33/6685; F05D 2240/50; F05D 2240/56; F05D 2260/36; F05D 2260/98; F16J 15/447; F16J 15/4472; F16J 15/4474
See application file for complete search history.

(56) References Cited

U.S. PATENT DOCUMENTS

| | | | |
|---|---|---|---|
| 5,628,621 | A | 5/1997 | Toborg |
| 8,387,991 | B2 | 3/2013 | Durling |
| 9,810,095 | B2 | 11/2017 | Morreale et al. |
| 2013/0249172 | A1 | 9/2013 | Ivakitch et al. |
| 2015/0098816 | A1 | 4/2015 | Longtin |
| 2016/0305283 | A1* | 10/2016 | Morreale ............. F16J 15/3268 |
| 2017/0016350 | A1 | 1/2017 | Miller et al. |
| 2017/0191369 | A1 | 7/2017 | Partyka et al. |
| 2017/0307019 | A1 | 10/2017 | Vicogne et al. |
| 2020/0032672 | A1* | 1/2020 | Patard .................. F01D 25/183 |

OTHER PUBLICATIONS

Partial Search Report for Application No. 19164722.1; dated Jun. 26, 2019 (11 pages).

* cited by examiner

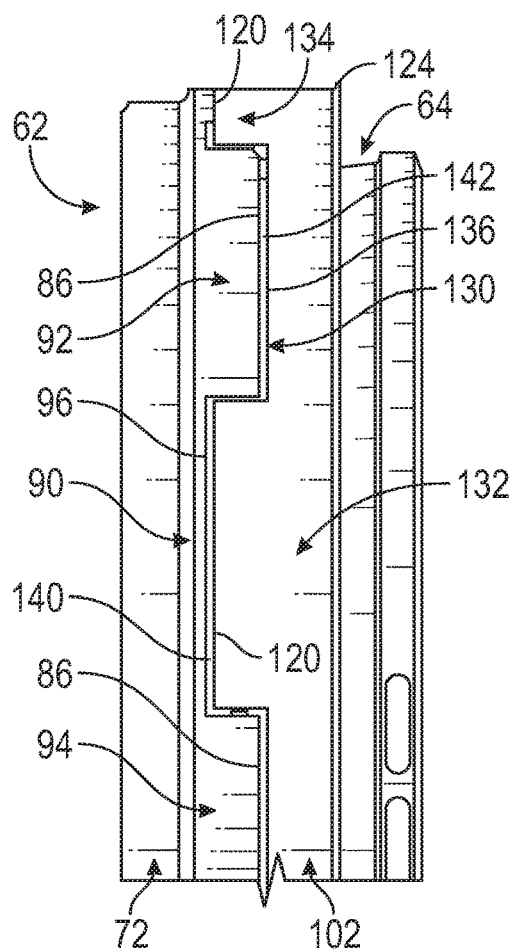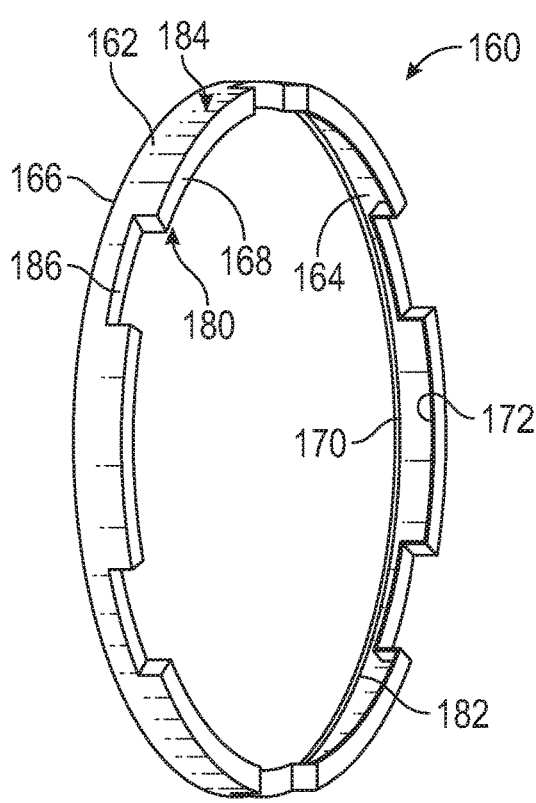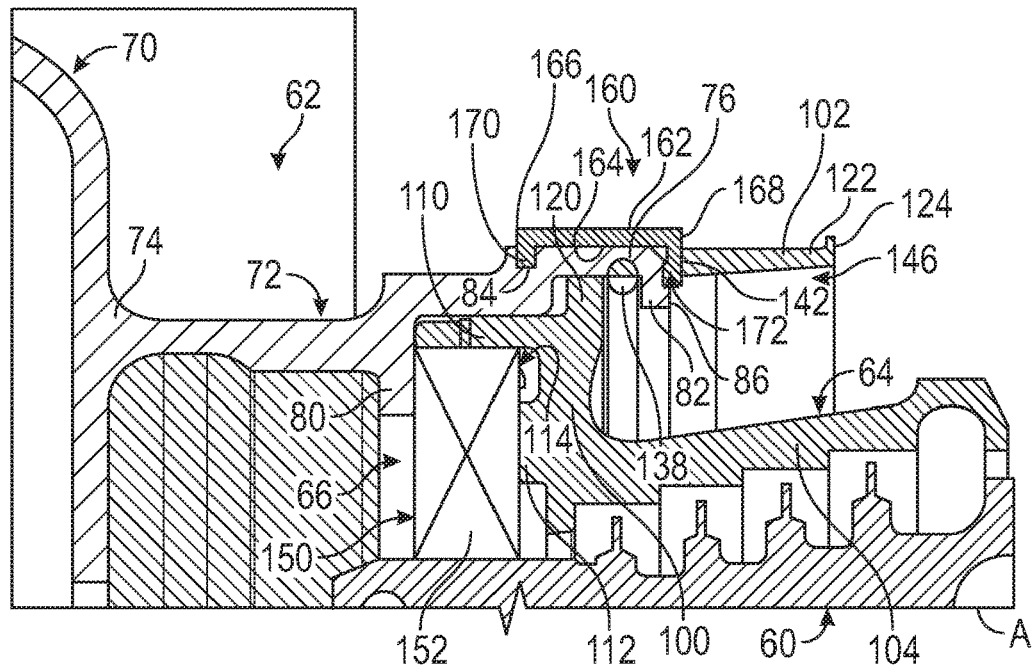
FIG. 2
FIG. 3
FIG. 4

GAS TURBINE ENGINE HAVING A SEALING MEMBER

BACKGROUND

Exemplary embodiments of the present disclosure pertain to the art of sealing between members of a gas turbine engine.

Gas turbine engines may be provided with a sealing system that is arranged to inhibit oil from exiting a bearing compartment. The presence of oil outside of the bearing compartment may be prevented by the use of one or more brush seals. However, there is a continuing need to improve the brush seal sealing performance. Accordingly, it is desirable to provide an improved seal to prevent oil from exiting the bearing compartment.

BRIEF DESCRIPTION

Disclosed is a gas turbine engine that includes a cover, a support, and a sealing member. The cover has a cover housing and a cover arm extending from the cover housing between a first arm end connected to the cover housing and a second arm end having a cover end surface. The support has a support body, a first support arm extending between a first support arm first end connected to the support body and a first support arm second end. The cover arm extends into the first support arm. The sealing member at least partially extends across a gap defined between the cover end surface and the first support arm.

In addition to one or more of the features described above, or as an alternative to any of the foregoing embodiments, the first support arm has a support end face.

In addition to one or more of the features described above, or as an alternative to any of the foregoing embodiments, the first support arm is disposed between a first support lug and a second support lug.

In addition to one or more of the features described above, or as an alternative to any of the foregoing embodiments, the cover arm is disposed between the first support lug and the second support lug.

In addition to one or more of the features described above, or as an alternative to any of the foregoing embodiments, the gap is defined between the cover end surface and the support end face.

In addition to one or more of the features described above, or as an alternative to any of the foregoing embodiments, the sealing member extends between a first sealing member end and a second sealing member end.

In addition to one or more of the features described above, or as an alternative to any of the foregoing embodiments, the cover arm defines a groove that is disposed proximate the second arm end.

In addition to one or more of the features described above, or as an alternative to any of the foregoing embodiments, the sealing member defines a first flange disposed proximate the first sealing member end and is arranged to be received within the groove.

In addition to one or more of the features described above, or as an alternative to any of the foregoing embodiments, the sealing member defines a second flange that is disposed proximate the second sealing member end and is arranged to be received within at least one of the gap or a groove defined by the first support arm.

In addition to one or more of the features described above, or as an alternative to any of the foregoing embodiments, the sealing member defines a sealing lug that extends towards the support end face and is disposed between the first support lug and the second support lug.

In addition to one or more of the features described above, or as an alternative to any of the foregoing embodiments, the sealing member defines a lip that extends from the sealing member second end towards the first support arm second end.

In addition to one or more of the features described above, or as an alternative to any of the foregoing embodiments, the lip extends across the first support lug and the second support lug.

In addition to one or more of the features described above, or as an alternative to any of the foregoing embodiments, the sealing member defines a first sealing member notch that extends from the second sealing member end towards the first sealing member end. The first support lug being received within the first sealing member notch.

In addition to one or more of the features described above, or as an alternative to any of the foregoing embodiments, the sealing member defines a second sealing member notch offset from the first sealing member notch and extends from the first sealing member end towards the second sealing member end.

In addition to one or more of the features described above, or as an alternative to any of the foregoing embodiments, the sealing member includes a first sealing member face extends between the first sealing member end and the second sealing member end. The first sealing member face includes a tab that extends towards the first arm end.

Also disclosed is a gas turbine engine that includes a cover and a support. The cover has a cover arm extending between a first arm end and a second arm end having a cover end surface. The cover arm defines a cover notch that extends from second arm end towards a notch end surface and is disposed between a first cover lug and a second cover lug. The support has a support body and a first support arm extending between a first support arm first end connected to the support body and a first support arm second end. The first support arm defines a support notch that extends from the first support arm first end towards a support end face and is disposed between a first support lug and a second support lug. The first cover lug is received within the support notch and the first support lug is received within the cover notch. A first gap is defined between the first support lug and the notch end surface and a second gap is defined between the first cover lug and the support end face.

In addition to one or more of the features described above, or as an alternative to any of the foregoing embodiments, a sealing member arranged to be received within at least one of the first gap and the second gap. The sealing member has a first sealing member face that extends between a first sealing member end and a second sealing member end. The first sealing member face includes a tab that extends towards the first arm end.

In addition to one or more of the features described above, or as an alternative to any of the foregoing embodiments, a sealing member extending between a first sealing member end having a first flange that is received within a groove defined by the cover arm and disposed proximate the first gap and a second sealing member end having a second flange that is received within the second gap.

In addition to one or more of the features described above, or as an alternative to any of the foregoing embodiments, the sealing member defines a sealing lug having a sealing face that is disposed proximate the support end face.

In addition to one or more of the features described above, or as an alternative to any of the foregoing embodiments, a first sealing member notch that extends from the second sealing member end towards the first sealing member end and is arranged to receive the first support lug.

In addition to one or more of the features described above, or as an alternative to any of the foregoing embodiments, a second sealing member notch that extends from the first sealing member end towards the second sealing member end and is arranged to receive the first cover lug.

BRIEF DESCRIPTION OF THE DRAWINGS

The following descriptions should not be considered limiting in any way. With reference to the accompanying drawings, like elements are numbered alike:

FIG. 2 is a side view of a cover and a support of the gas turbine engine;

FIG. 3 is a perspective view of a sealing member;

FIGS. 4 and 5 are views of the sealing member installed within the gas turbine engine;

DETAILED DESCRIPTION

A detailed description of one or more embodiments of the disclosed apparatus and method are presented herein by way of exemplification and not limitation with reference to the Figures.

Figure 1:
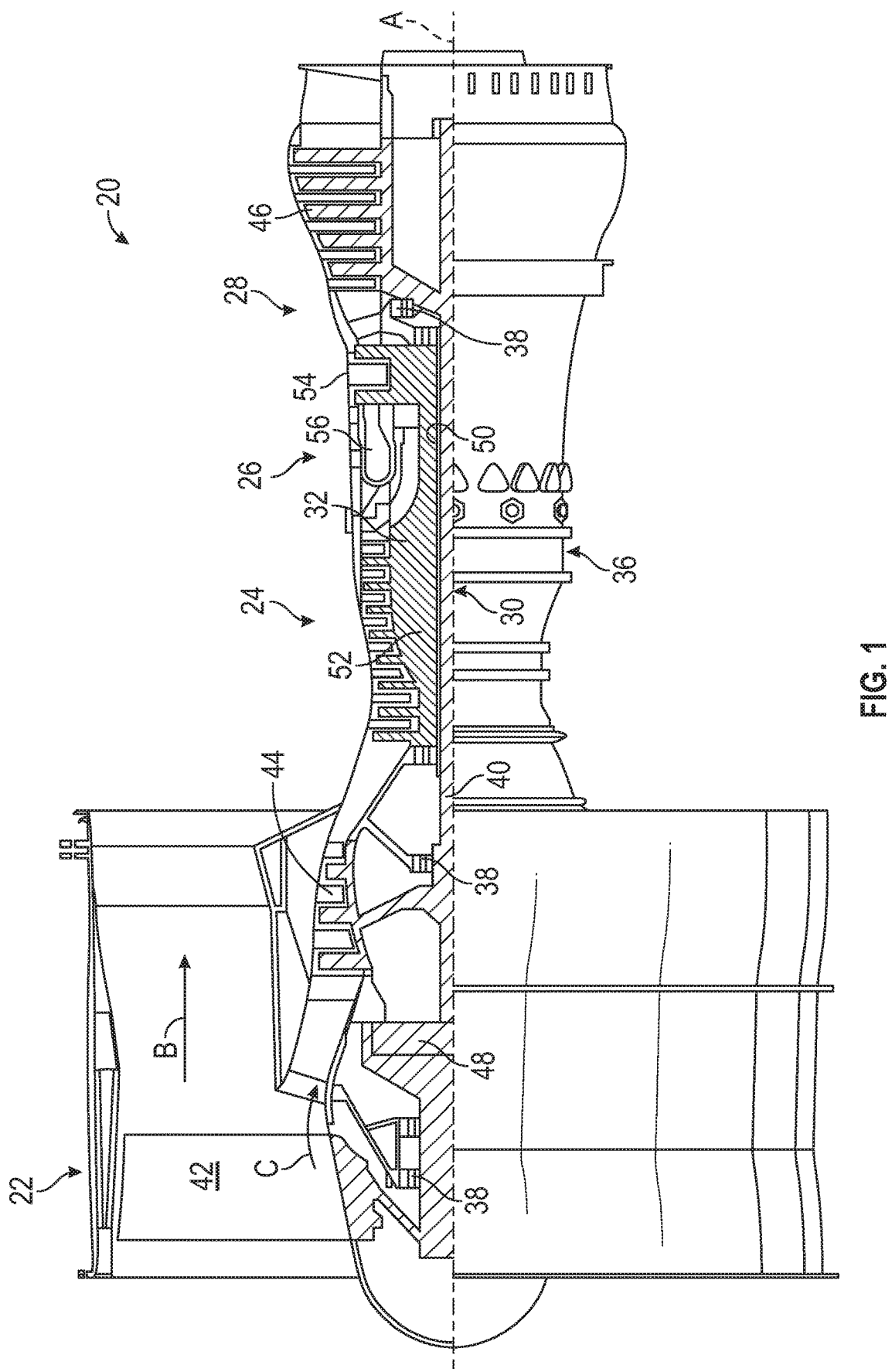
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 m/sec).

The inner shaft 40 and/or the outer shaft 50 may carry a component having a knife edge seal 60 that may rotate about the engine central longitudinal axis A, relative to static components, such as a cover 62 and a support 64, as shown in FIGS. 4, 7, 10, and 12. The static components may carry a gap seal 66, such as a brush seal system, that engages at least a portion of the component having the knife edge seal 60.

The cover 62 may be an annular component that is disposed about the engine central longitudinal axis A. The cover 62 includes a cover housing 70 and a cover arm 72 that extends from the cover housing 70. The cover arm 72 is disposed generally parallel to the engine central longitudinal axis A. The cover arm 72 extends between a first arm end 74 that is connected to the cover housing 70 and a second arm end 76 (which may include a single tab or multiples tabs) that is disposed opposite the first arm end 74.

The cover arm 72 includes a first arm 80, a second arm 82, and a groove 84. The first arm 80 is disposed between the first arm end 74 and the second arm end 76. The first arm 80 extends towards the engine central longitudinal axis A and towards the component having the knife edge seal 60. The first arm 80 is disposed generally perpendicular to the cover arm 72.

The second arm 82 is spaced apart from the first arm 80 may be disposed at the second arm end 76. The second arm 82 extends towards the engine central longitudinal axis A and towards the component having a knife edge seal 60. The second arm 82 extends at least partially into the support 64. A distal end of the second arm 82 defines a cover end surface 86 that is disposed generally perpendicular to the engine central longitudinal axis A and is disposed generally parallel to the first arm 80.

The groove 84 may be an annular groove that extends about and at least partially through the cover arm 72. The groove 84 may be disposed between the first arm 80 and the second arm 82. The groove 84 may be disposed proximate the second arm end 76.

Referring to FIG. 2, the cover arm 72 includes at least one cover notch 90, a first cover lug 92, and a second cover lug 94. The cover notch 90 is disposed between the first cover lug 92 and the second cover lug 94. The cover notch 90 extends from the second arm end 76 towards the first arm end 74 and terminates at a notch end surface 96. The notch end surface 96 is disposed parallel to and is spaced apart from the cover end surface 86. In at least on embodiment, the cover notch 90 may not be provided.

The first cover lug 92 and the second cover lug 94 extend from the notch end surface 96 towards the cover end surface 86. The cover end surface 86 may be an interrupted or discontinuous surface that is defined by distal ends of the first cover lug 92 and the second cover lug 94.

Referring to FIGS. 4, 7, 10, and 12, the support 64 is connected to the cover arm 72 of the cover 62. The support 64 includes a support body 100, a first support arm 102, and a second support arm 104. The support body 100 extends along an axis that is disposed generally transverse to the engine central longitudinal axis A. The support body 100 includes a first support tab 110 and a first support protrusion 112.

The first support tab 110 extends from the support body 100 towards the first arm end 74 and the first arm 80 of the cover arm 72. The first support tab 110 may engage the first arm 80 of the cover arm 72 and at least a portion of the cover arm 72. The first support tab 110 engages a portion of the gap seal 66.

The first support protrusion 112 is spaced apart from the first support tab 110 and extends from the support body 100 towards the first arm end 74.

The first arm 80 of the cover arm 72 and the support body 100 having the first support tab 110 and the first support protrusion 112 define a brush seal cavity 114 that at least partially receives the gap seal 66.

The first support arm 102 extends from a first end of the support body 100 in a direction that is disposed opposite the direction in which the first support tab 110 extends. The first support arm 102 is disposed generally parallel to the first support tab 110 and is disposed generally parallel to the engine central longitudinal axis A. The first support arm 102 extends between a first support arm first end 120 that is connected to the support body 100 and a first support arm second end 122 that is disposed opposite the first support arm first end 120.

The first support arm 102 defines or includes a lip or a rim 124 that is disposed at the first support arm second end 122. The rim 124 extends in a direction that extends away from the second support arm 104 and is disposed generally perpendicular to the first support arm 102 and the engine central longitudinal axis A.

Referring to FIG. 2, the first support arm 102 includes a support notch 130, a first support lug 132, and the second support lug 134. The support notch 130 is disposed between the first support lug 132 and the second support lug 134. The support notch 130 extends from the first support arm first end 120 towards the first support arm second end 122 and terminates at a support end face 136 of the first support arm 102. In at least one embodiment, the support notch 130 may not be provided such that an end surface of the first support arm 102 is a continuous, uninterrupted surface.

The first support lug 132 and the second support lug 134 extend from the support end face 136 towards the first support arm first end 120. The first support lug 132 of the first support arm 102 of the support 64 extends into and is received within the cover notch 90, such that the first support lug 132 is disposed between the first cover lug 92 and the second cover lug 94. The first cover lug 92 of the cover arm 72 of the cover 62 extends into and is received within the support notch 130, such that the first cover lug 92 of the cover arm 72 is disposed between the first support lug 132 and the second support lug 134. The interfacing or interlocking between the cover lugs and the support lugs are anti-rotation features to inhibit rotational or circumferential motion between the cover 62 and the support 64 about the engine central longitudinal axis A. The anti-rotation features also act as circumferential orientation positioners creating an overlapping interface. This overlapping interface allows for axial retention (e.g. radial groove with axial retention feature such as a retaining ring 138 as shown in FIGS. 4, 7, 10, 12, and 14.

A first gap 140 is defined between distal ends of the first support lug 132 (i.e. the first support arm first end 120) and the notch end surface 96. A second gap 142 is defined between the cover end surface 86 of the first cover lug 92 and the support end face 136.

Referring to FIGS. 4, 7, 10, and 12, the second support arm 104 extends from a second end of the support body 100 in a direction that is disposed opposite the direction in which the first support tab 110 extends. The second support arm 104 is disposed closer to the first support protrusion 112 than the first support tab 110. The knife edge seals of the component having the knife edge seals 60 engage a surface of the second support arm 104.

A compartment 146 is defined by the support body 100, the first support arm 102, and the second support arm 104. The second arm 82 of the cover arm 72 extends into the compartment 146. In at least one embodiment, a portion of an oil deflector that is operatively connected to at least one of the inner shaft 40 and the outer shaft 50 extends into the compartment 146.

Referring to FIGS. 4, 7, 10, and 12, the gap seal 66 is disposed within the brush seal cavity 114. The gap seal 66 includes a sealing mechanism 152 disposed in a seal housing 150 that is connected to at least one of the first support tab 110 and the first support protrusion 112 and engages a surface of the component having the knife edge seal 60 and is arranged to inhibit oil from exiting a bearing compartment responsive to pressure differences.

A sealing member 160 may be provided to improve the sealing performance of the gap seal 66 through larger ranges of pressure differences. The sealing member 160 may be applied to or extend over at least one of the first gap 140 and the second gap 142 to mitigate or inhibit the migration of oil through the gaps 140, 142 or into the compartment 146. The sealing member 160 creates a more circuitous or labyrinth path for any oil that may leak or seep. The sealing member 160 may be provided as a separate piece or may be integrated with at least one of the cover 62 and/or the support 64.

Referring to FIGS. 3-15, the sealing member 160 includes a first sealing member face 162 and a second sealing member face 164 each extending between a first sealing member end 166 and a second sealing member end 168. The first sealing member face 162 may form an external surface of the sealing member 160 that is spaced apart from a surface of at least one of the cover 62 and/or the support 64 and the second sealing member face 164 may form an internal surface that engages a surface of at least one of the cover 62 and/or the support 64, as shown in FIGS. 3-11.

Referring to FIGS. 3-11, the sealing member 160 may be a sealing gasket that is made of a flexible or malleable material or membrane. The sealing member 160 may be an arcuate ring that is disposed about a portion of at least one of the cover arm 72 of the cover 62 and the first support arm 102 of the support 64.

The sealing member 160 extends between the cover arm 72 of the cover 62 and the first support arm 102 of the support 64. The sealing member 160 includes a first flange 170 and a second flange 172. The first flange 170 is disposed proximate the first sealing member end 166 and extends from the second sealing member face 164. The first flange 170 is arranged to be received within the groove 84. The first flange 170 is disposed proximate the first gap 140. The second flange 172 is disposed proximate the second sealing member end 168 and extends from the second sealing member face 164. The second flange 172 is arranged to be received within the second gap 142. The second flange 172 engages the cover end surface 86 and at least a portion of the first support arm 102.

Figure 5:
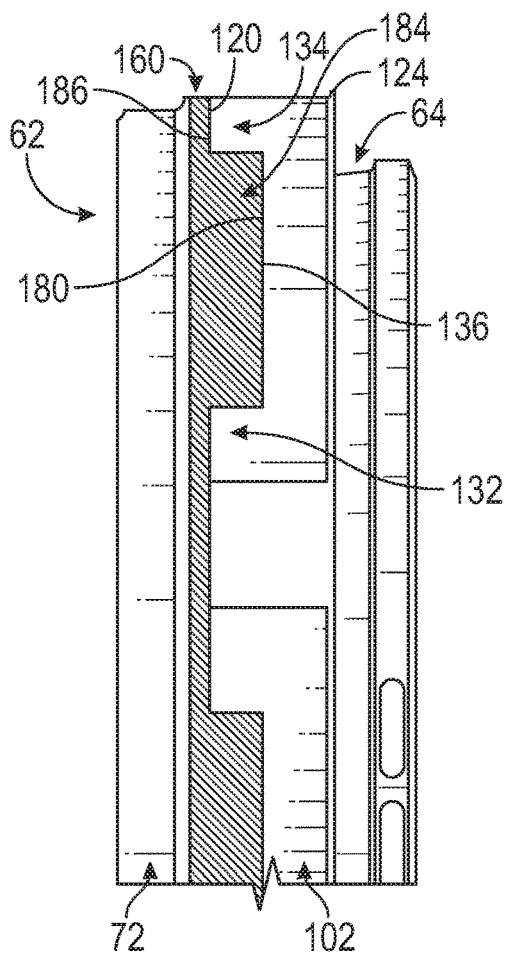

Referring to FIGS. 3-5, the sealing member 160 may include a castellated sealing face 180 and a sealing groove 182. The castellated sealing face 180 may be disposed proximate the second sealing member end 168 and extend between the first sealing member face 162 and the second sealing member face 164.

The castellated sealing face 180 may be defined by at least one sealing lug 184 that extends from an end face 186 of the sealing member 160 towards the support end face 136 of the first support arm 102 of the support 64. At least one sealing lug 184 is disposed between the first support lug 132 and the second support lug 134 of the support 64. At least one sealing lug 184 is disposed over at least one of the first cover lug 92 and/or the second cover lug 94. The first support arm first end 120 engages the end face 186 of the sealing member 160. The castellated sealing face 180 that is disposed at the distal end of the at least one sealing lug 184 is disposed proximate and engages the support end face 136 of the support 64.

The sealing groove 182 is disposed proximate the first sealing member end 166. The sealing groove 182 extends from the second sealing member face 164 towards the first sealing member face 162. The sealing groove 182 is arranged to aid in applying the sealing member 160 over a portion of the cover arm 72 of the cover 62. The sealing groove 182 inhibits axial movement of the sealing member 160.

Figure 6:
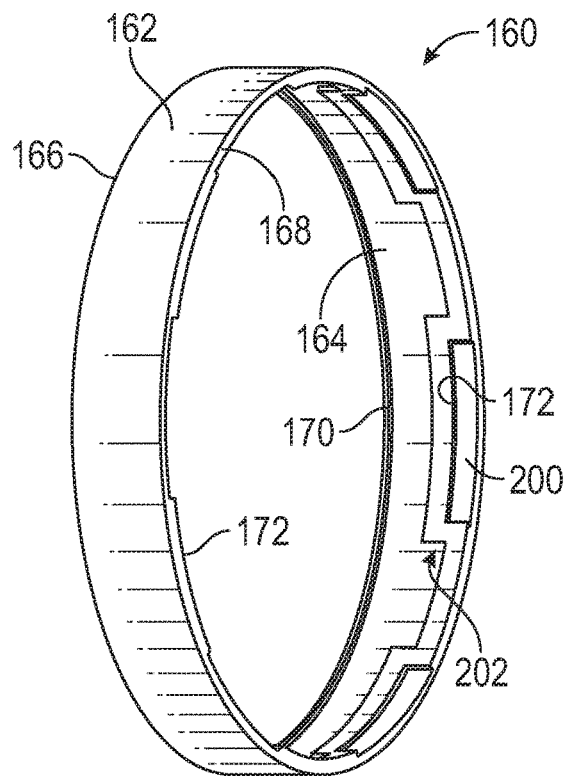
FIG. 6 is a perspective view of a sealing member.
Figure 7:
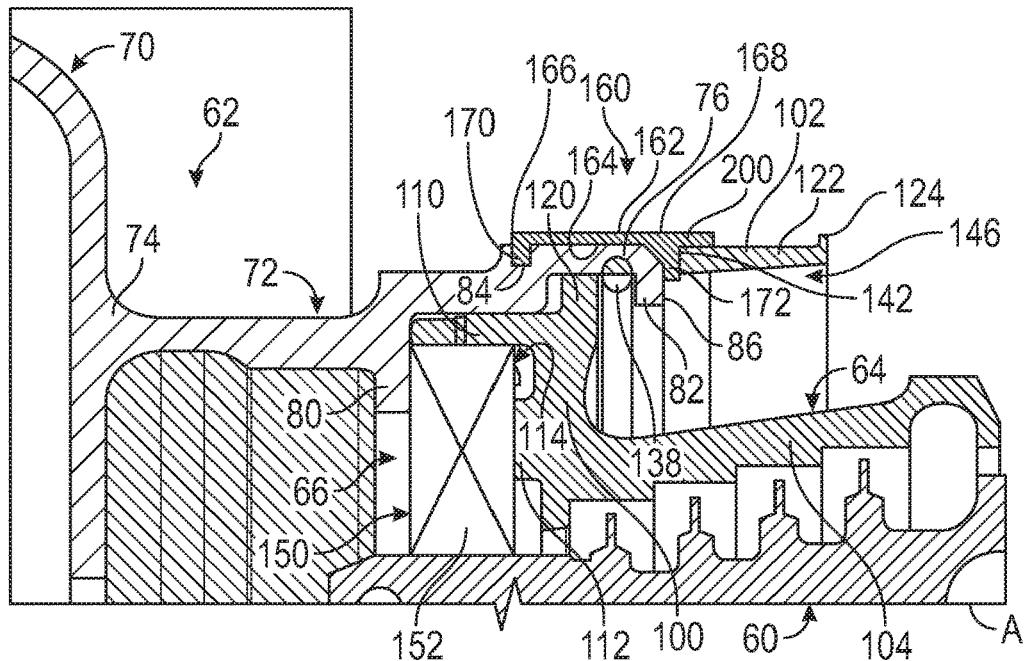
FIGS. 7 and 8 are views of the sealing member installed within the gas turbine engine.
Figure 8:
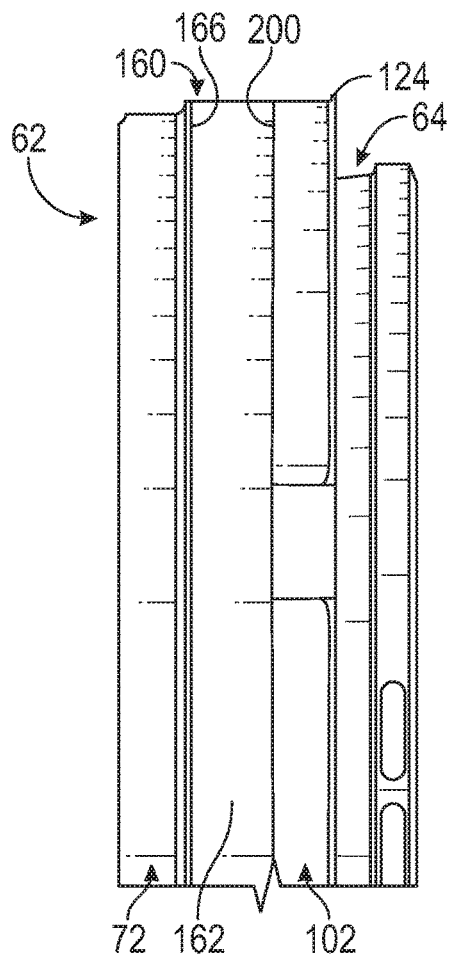

Referring to FIGS. 6-8, the sealing member 160 defines or includes a lip 200. The lip 200 extends from the second sealing member end 168 towards the first support arm second end 122 and away from the second arm end 76 of the cover 62. The lip 200 extends across the first support lug 132 and the second support lug 134.

The lip 200 creates a larger sealing surface area and extends across the second gap 142. The lip 200 is a generally continuous surface that is not an interrupted or a castellated surface.

The second flange 172 may be arranged as a series of protrusions 202 that extend from the second sealing member face 164, as shown in FIG. 6. In at least one embodiment, the series of protrusions 202 may not be provided should the cover notch 90 and/or the support notch 130 not be provided.

Figure 9:
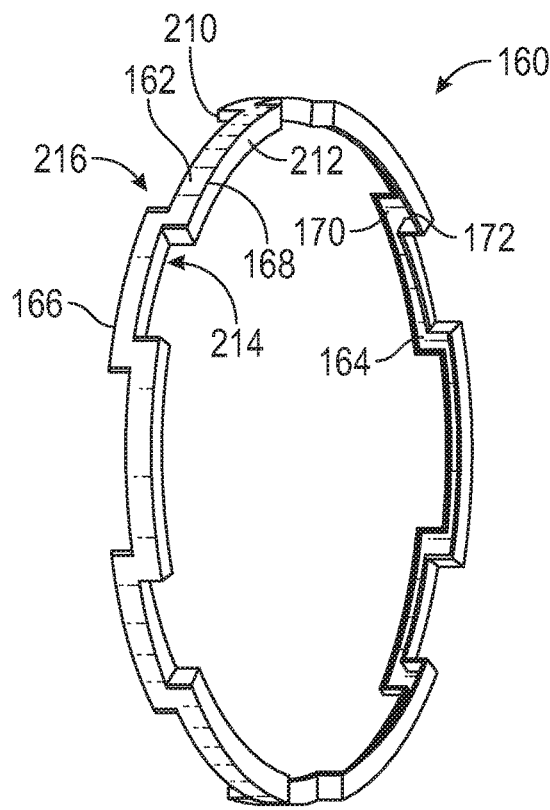
FIG. 9 is a perspective view of a sealing member.
Figure 10:
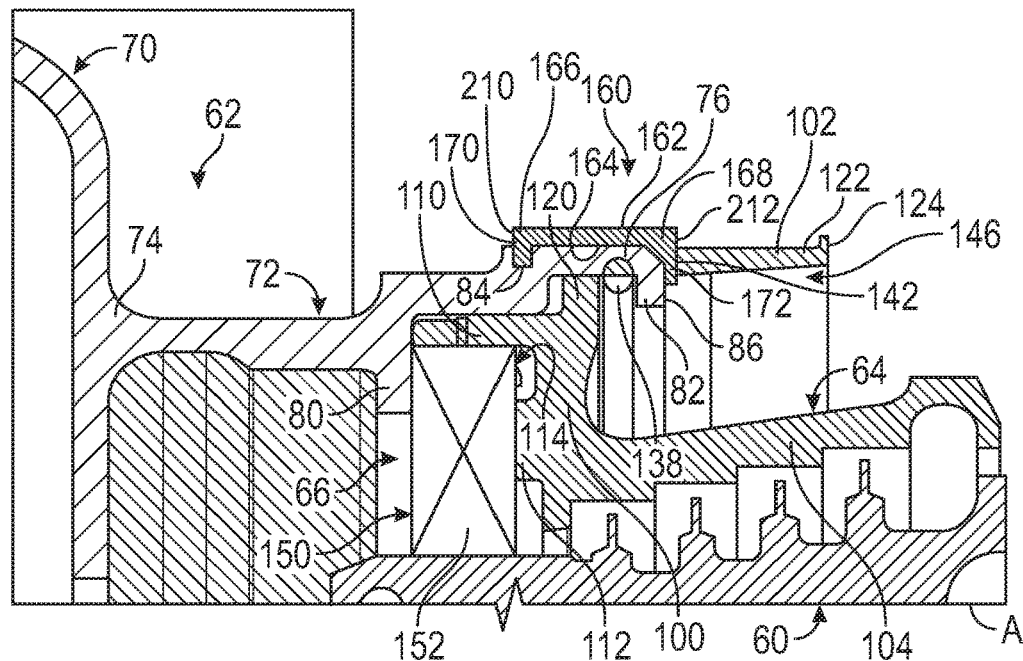
FIGS. 10 and 11 are views of the sealing member installed within the gas turbine engine.
Figure 11:
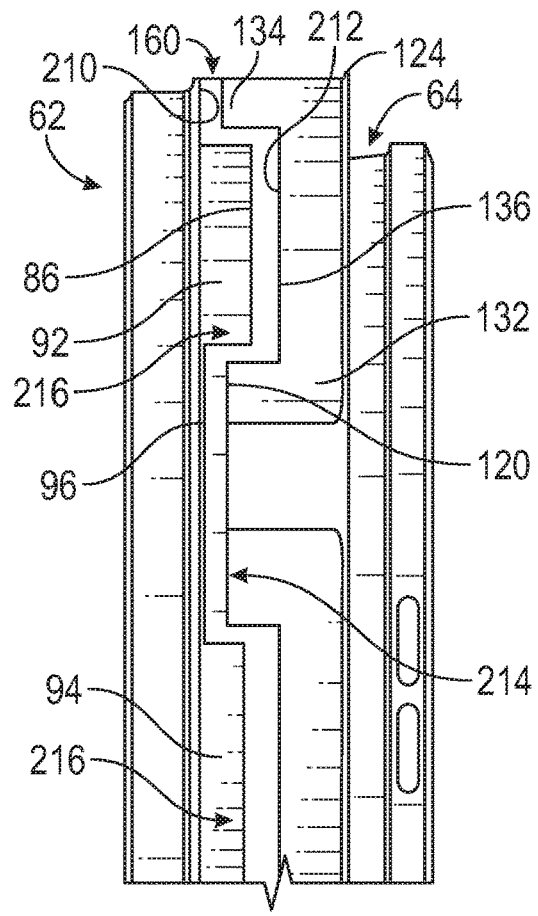

Referring to FIGS. 9-11, the sealing member 160 includes a first end face 210 that is disposed proximate the first sealing member end 166 and extends between the first sealing member face 162 and the second sealing member face 164. The sealing member 160 also includes a second end face 212 that is disposed opposite the first end face 210. The second end face 212 is disposed proximate the second sealing member end 168 and extends between the first sealing member face 162 and the second sealing member face 164.

The first end face 210 and/or the second end face 212 may be arranged as a continuous ring or continuous surfaces or as interrupted surfaces that are interrupted by a series of notches and resulting lugs. As such, the sealing member 160 defines a first sealing member notch 214 and a second sealing member notch 216.

The first sealing member notch 214 extends from the second sealing member end 168 towards the first sealing member end 166. The first sealing member notch 214 is arranged to receive at least one of the first support lug 132 or the second support lug 134 of the support 64.

The second sealing member notch 216 is circumferentially offset from the first sealing member notch 214. The second sealing member notch 216 extends from the first sealing member end 166 towards the second sealing member end 168. The second sealing member notch 216 is arranged to receive at least one of the first cover lug 92 or the second cover lug 94.

Figure 12:
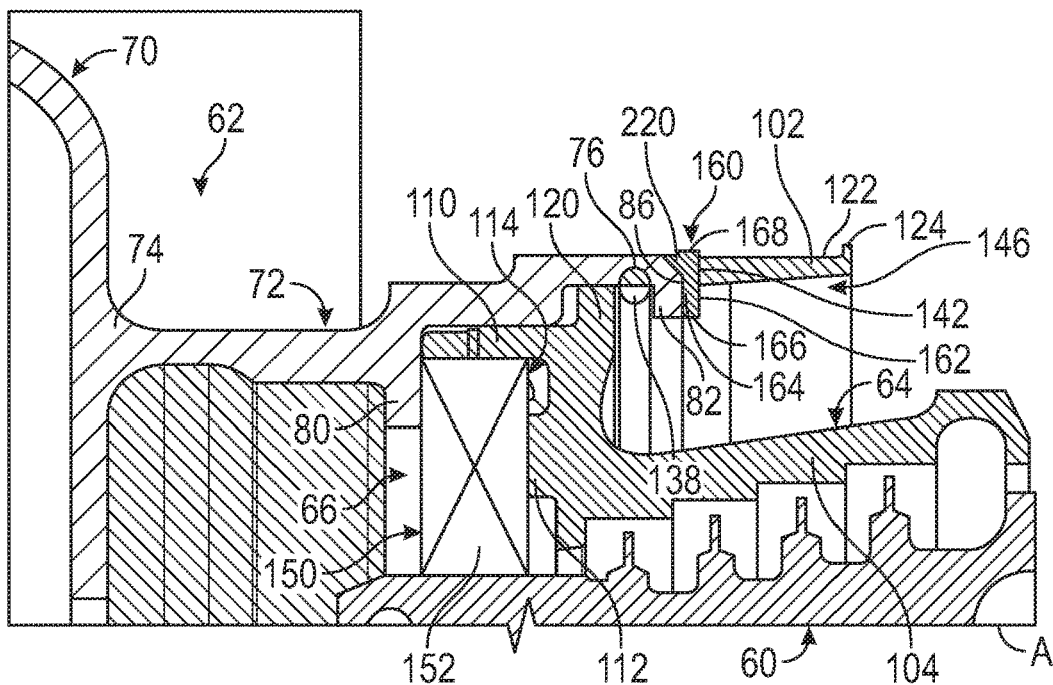
FIGS. 12 and 13 are views of the sealing member installed within the gas turbine engine.
Figure 13:
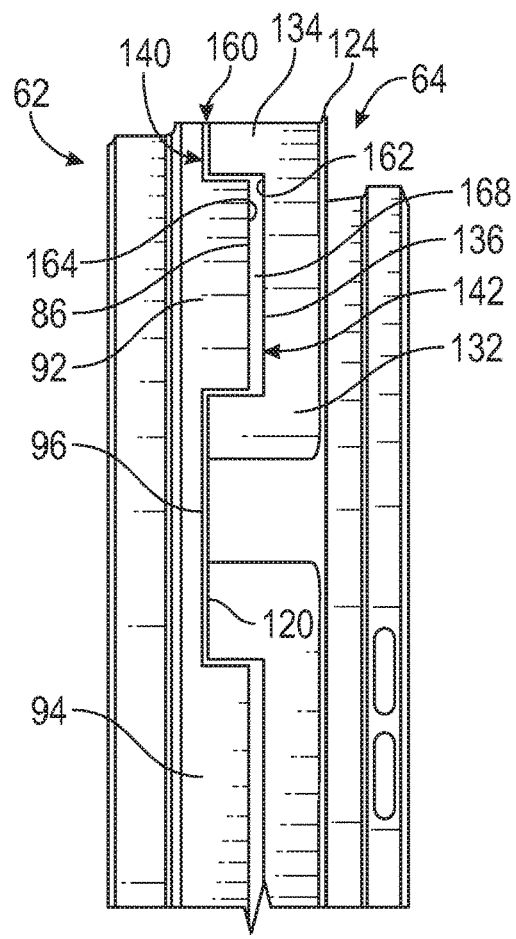

Referring to FIGS. 12 and 13, the sealing member 160 is arranged to be received within at least one of the first gap 140 and the second gap 142. The first sealing member end 166 extends into the compartment 146 and the second sealing member end 168 is disposed outside of the compartment 146. The second sealing member face 164 engages the cover end surface 86 and the first sealing member face 162 engages a portion of the first support arm 102.

The sealing member 160 includes a tab 220 that is disposed proximate the extends along the second arm 82 and the cover end surface 86 towards the first arm and 74 of the cover arm 72 of the cover 62.

The sealing member 160 may be applied (e.g. sprayed or otherwise coated) on the first and second cover lugs 92, 94 and the notch end surface 96 and/or the first and second support lugs 132, 134 and the support end face 136. The sealing member 160 may be a rubberized spray that is disposed on at least one of the cover 62 and/or the support 64 prior to assembly.

Figure 14:
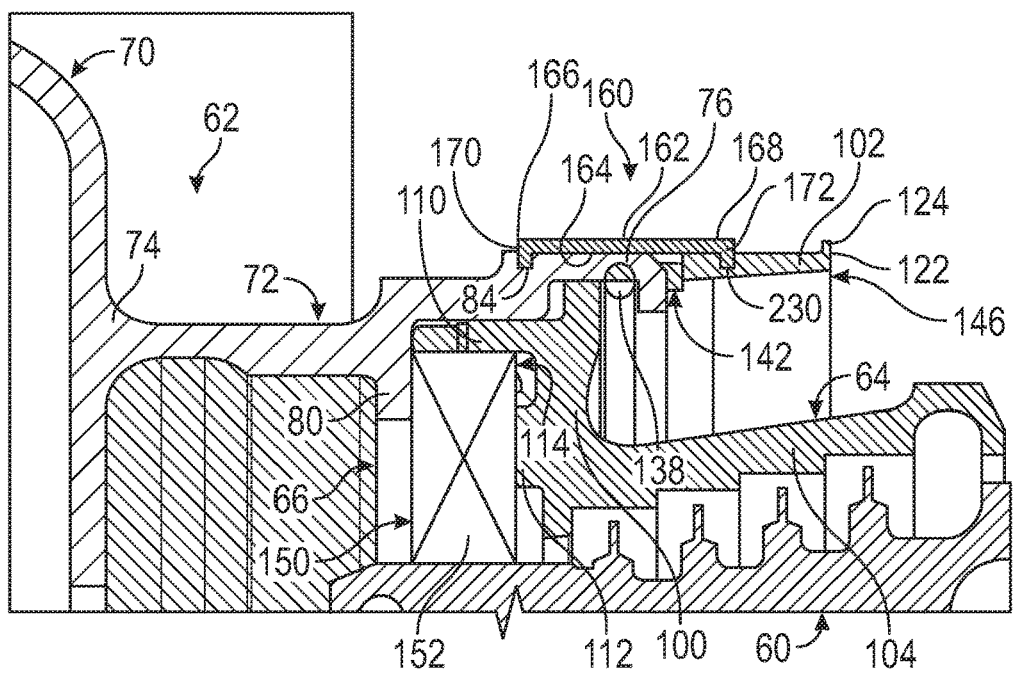
FIGS. 14 and 15 are views of the sealing member installed within the gas turbine engine.
Figure 15:
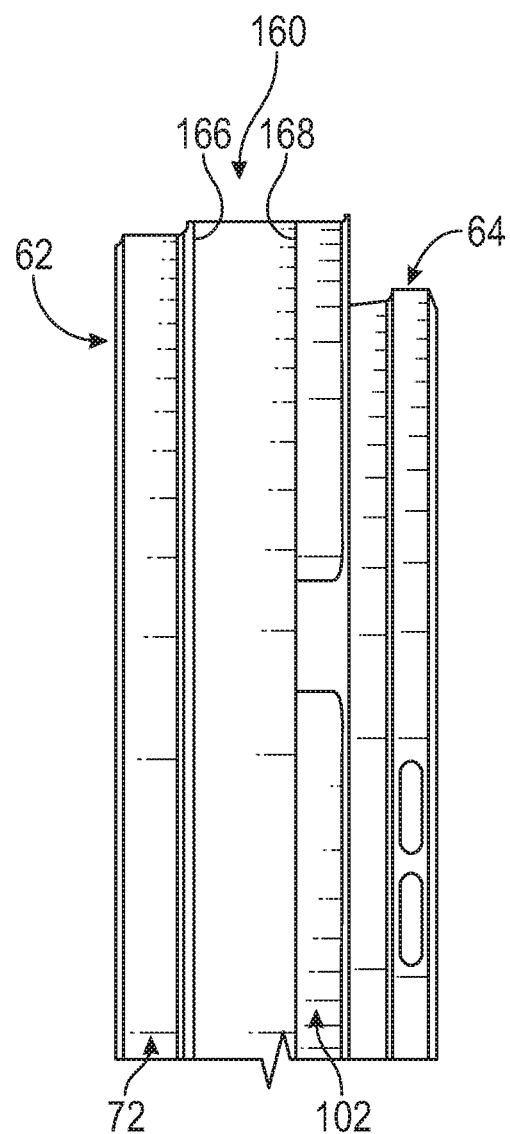

Referring to FIGS. 14 and 15, the sealing member 160 may be arranged as a cover or a sleeve that extends about portions of the cover 62 and the support 64. The sealing member 160 extends over or across the first gap 140 and/or the second gap 142 and be connected to the cover arm 72 of the cover 62 and the first support arm 102 of the support 64. The first flange 170 extends into the groove 84 of the cover arm 72 and the second flange 172 extends into a groove 230 defined by the first support arm 102 of the support 64.

The addition of the static sealing member 160 along with the gap seal 66 improves the oil containment capability of the gap seal 66 by creating a more robust sealing system to pressure differentials to inhibit oil or other fluid leakage by reducing the number of potential oil paths from the oil-wetted bearing compartment to the compartment 146.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine, comprising:
    a cover having a cover housing and a cover arm extending from the cover housing between a first arm end connected to the cover housing and a second arm end having a cover end surface;
    a support having a support body, a first support arm extending between a first support arm first end connected to the support body and a first support arm second end, the first support arm having a support end face, a first support lug and a second support lug, the cover arm extending into the first support arm and the cover arm is disposed between the first support lug and the second support lug; and
    a sealing member that at least partially extends across a gap defined between the cover end surface and the first support arm.

2. The gas turbine engine of claim 1, wherein the sealing member extends into the gap.

3. The gas turbine engine of claim 1, wherein the sealing member extends between a first sealing member end and a second sealing member end.

4. The gas turbine engine of claim 3, wherein the cover arm defines a groove that is disposed proximate the second arm end.

5. The gas turbine engine of claim 4, wherein the sealing member defines a first flange disposed proximate the first sealing member end and is arranged to be received within the groove.

6. The gas turbine engine of claim 4, wherein the sealing member defines a second flange that is disposed proximate the second sealing member end and is arranged to be received within at least one of the gap or a groove defined by the first support arm.

7. The gas turbine engine of claim 4, wherein the sealing member defines a sealing lug that extends towards the support end face and is disposed between the first support lug and the second support lug.

8. The gas turbine engine of claim 4, wherein the sealing member defines a lip that extends from the sealing member second end towards the first support arm second end.

9. The gas turbine engine of claim 8, wherein the lip extends across the first support lug and the second support lug.

10. The gas turbine engine of claim 4, wherein the sealing member defines a first sealing member notch that extends from the second sealing member end towards the first sealing member end, the first support lug being received within the first sealing member notch.

11. The gas turbine engine of claim 10, wherein the sealing member defines a second sealing member notch offset from the first sealing member notch and that extends from the first sealing member end towards the second sealing member end.

12. The gas turbine engine of claim 4, wherein the sealing member includes a first sealing member face that extends between the first sealing member end and the second sealing member end, the first sealing member face includes a tab that extends towards the first arm end.

13. A gas turbine engine, comprising:
    a cover having a cover arm extending between a first arm end and a second arm end having a cover end surface, the cover arm defining a cover notch that extends from second arm end towards a notch end surface and is disposed between a first cover lug and a second cover lug;
    a support having a support body, a first support arm extending between a first support arm first end connected to the support body and a first support arm second end, the first support arm defining a support notch that extends from the first support arm first end towards a support end face and is disposed between a first support lug and a second support lug, the first cover lug being received within the support notch and the first support lug being received within the cover notch; and a first gap defined between the first support lug and the notch end surface and a second gap defined between the first cover lug and the support end face.

14. The gas turbine engine of claim 13, further comprising:
a sealing member arranged to be received within at least one of the first gap and the second gap, the sealing member having a first sealing member face that extends between a first sealing member end and a second sealing member end, the first sealing member face includes a tab that extends towards the first arm end.

15. The gas turbine engine of claim 13, further comprising:
a sealing member extending between a first sealing member end having a first flange that is received within a groove defined by the cover arm and disposed proximate the first gap and a second sealing member end having a second flange that is received within the second gap.

16. The gas turbine engine of claim 15, wherein the sealing member defines a sealing lug having a sealing face that is disposed proximate the support end face.

17. The gas turbine engine of claim 15, wherein the sealing member defines:
a first sealing member notch that extends from the second sealing member end towards the first sealing member end and is arranged to receive the first support lug; and
a second sealing member notch that extends from the first sealing member end towards the second sealing member end and is arranged to receive the first cover lug.

* * * * *